United States Patent
Pavan et al.

(10) Patent No.: US 7,861,484 B2
(45) Date of Patent: Jan. 4, 2011

(54) METHOD FOR MAKING A SOUND-INSULATING LOAD-BEARING FLOOR

(75) Inventors: Massimiliano Pavan, Milan (IT); Elio Ganci, Milan (IT); Raffaella Donetti, Milan (IT); Massimo Marini, Milan (IT); Diego Tirelli, Milan (IT); Franco Peruzzotti, Milan (IT)

(73) Assignee: Pirelli & C. S.p.A., Milan (IT)

( * ) Notice: Subject to any disclaimer, the term of this patent is extended or adjusted under 35 U.S.C. 154(b) by 702 days.

(21) Appl. No.: 11/885,396

(22) PCT Filed: Mar. 4, 2005

(86) PCT No.: PCT/EP2005/002320

§ 371 (c)(1), (2), (4) Date: Aug. 30, 2007

(87) PCT Pub. No.: WO2006/094523

PCT Pub. Date: Sep. 14, 2006

(65) Prior Publication Data

US 2008/0250751 A1    Oct. 16, 2008

(51) Int. Cl.
*E04B 1/00* (2006.01)

(52) U.S. Cl. .................... 52/741.4; 52/309.13

(58) Field of Classification Search .......... 52/309.13, 52/741.4, 309.1, 309.14
See application file for complete search history.

(56) References Cited

U.S. PATENT DOCUMENTS 4,010,123 A * 3/1977 Blunt et al. ............. 521/83
4,104,210 A 8/1978 Coran et al.
4,456,705 A * 6/1984 McCarthy ............... 521/83

(Continued)

FOREIGN PATENT DOCUMENTS

EP    0 324 430 A1    7/1989

(Continued)

OTHER PUBLICATIONS

Machine Translation for French Patent FR 2433617 A, Translation generated May 11, 2010.*
Karaushi, M. et al., "Vibration-Proof, Soundproof Rubber Composition," Patent Abstracts of Japan, JP. No. 58213042, 1 page, (Dec. 10, 1983).

*Primary Examiner*—Richard E Chilcot, Jr.
*Assistant Examiner*—Mark R Wendell
(74) *Attorney, Agent, or Firm*—Finnegan, Henderson, Farabow, Garrett & Dunner, L.L.P.

(57) ABSTRACT

A method for making a sound-insulating load-bearing floor, includes the following steps: applying a sound-insulating material over a load-bearing floor as to form a continuous coating layer; allowing the continuous coating layer to harden; applying a covering floor over said hardened continuous coating layer; wherein the sound-insulating material includes: 40% by weight to 95% by weight, preferably 60% by weight to 90% by weight, with respect to the total weight of the sound-insulating material, of at least one rubber in a subdivided form; 5% by weight to 60% by weight, preferably 10% by weight to 40% by weight, with respect to the total weight of the sound-insulating material, of at least one binding agent including: a first, component including at least one organic compound having at least one acid functional group or a derivative thereof, the first component having a Brookfield viscosity, measured at 23° C., of 0.1 Pa·s to 100 Pa·s, preferably 0.2 Pa·s to 50 Pa·s, more preferably 0.5 Pa·s to 20 Pa·s; and a second component including at least one metal oxide or hydroxide.

68 Claims, 1 Drawing Sheet

U.S. PATENT DOCUMENTS

| | | | | |
|---|---|---|---|---|
| 4,495,240 A | * | 1/1985 | McCarthy | 428/319.1 |
| 4,588,634 A | * | 5/1986 | Pagen et al. | 442/90 |
| 4,698,249 A | * | 10/1987 | Brown | 428/44 |
| 5,093,394 A | * | 3/1992 | Rees et al. | 524/68 |
| 5,094,318 A | * | 3/1992 | Maeda et al. | 181/290 |
| 5,956,921 A | * | 9/1999 | Fleck et al. | 52/741.3 |
| 6,200,638 B1 | * | 3/2001 | Ordway | 427/355 |
| 6,828,020 B2 | * | 12/2004 | Fisher et al. | 428/355 EN |

FOREIGN PATENT DOCUMENTS

| | | | | |
|---|---|---|---|---|
| FR | 2.221.465 | | | 10/1974 |
| FR | 2433617 A | * | | 4/1980 |
| WO | WO 00/26485 | | | 5/2000 |
| WO | WO 02/48478 A1 | | | 6/2002 |

* cited by examiner

METHOD FOR MAKING A SOUND-INSULATING LOAD-BEARING FLOOR

CROSS REFERENCE TO RELATED APPLICATION

This application is a national phase application based on PCT/EP2005/002320, filed Mar. 4, 2005, the content of which is incorporated herein by reference.

BACKGROUND OF THE INVENTION

1. Field of the Invention

The present invention relates to a method for making a sound-insulating load-bearing floor.

In particular, the present invention relates to a method for making a sound-insulating load-bearing floor, said method comprising the step of applying over said load-bearing floor a sound-insulating material including at least one rubber in a subdivided form and at least one binding agent.

In a further aspect, the present invention also relates to a sound-insulating material including at least one rubber in a subdivided form and at least one binding agent.

In a still further aspect, the present invention also relates to a building structure including at least one load-bearing floor, said load-bearing floor comprising a sound-insulating material including at least one rubber in a subdivided form and at least one binding agent.

2. Description of the Related Art

In building constructions, in particular in building constructions including two or more stories, it is known to include a sound-insulating material on the load-bearing floor of the upper floors. The sound-insulating material minimizes the pressure of sound generated into a room and traveling downward through the load-bearing floor. Sound-insulating material functions by reflecting sound waves, absorbing sound waves, and/or disrupting sound waves.

Conventional sound-insulating materials comprise pre-formed sheets of cork, asphalt, or other materials such as, for example, foamed polyethylene, foamed polyurethane.

However, said sound insulating materials may show some disadvantages.

For example, the asphalt typically comprises about 80% by weight of tar, the remainder including clay, solvents, and other fillers. One disadvantage of the asphalt is that upon aging, it tends to harden. It also hardens in cold weather. When asphalt hardens, it tends to crack if the floor expands or contracts (e.g. as a consequence of temperatures changes). Similarly, since cork comprises a matrix of particles pressed together, the cork also tends to develop cracks if the floor expands or contracts (e.g. as a consequence of temperatures changes).

Moreover, the application of pre-formed sheets only seldom allows to make a continuous coating layer of a sound-insulating material onto the surface of the load-bearing floor. As a matter of fact, in particular at the joining zones between the different pre-formed sheets which do not always fit perfectly together, an acoustic bridge between the load-bearing floor and the covering floor may occur. Furthermore, when applying the covering floor onto the surface of the pre-formed sheets, said pre-formed sheets may move so causing the formation of an acoustic bridge between the load-bearing floor and the covering floor. The travel of the sounds through said acoustic bridges negatively affect their sound-insulating properties.

Other sound-insulating materials have been already suggested in the art.

For example, International Patent Application WO 02/48478 relates to a light soundproof floor-filling structure for filling the space between a floor surface and the level of the laying plane of the walking-on floor covering. Said soundproof floor-filling structure consists of a mixture of concrete as air-hardening binder and a given amount of grains of resin materials which may be selected from polyvinyl resins, polyethylene, polypropylene, polyvinylchloride, caoutchouc, rubbers in general, polycarbons, silicon resins, plastics of different kinds. Metal elements such as copper and tin may be present as either pure metal or alloys. The above-mentioned structure is said to have the following features: lightness, soundproofing, compactness, workability, mechanical strength and environmental compatibility.

International Patent Application WO 00/26485 relates to an acoustic insulating material with a filler which is mainly made of granules of a sound-deadening component, mixed with a binding agent, such that an almost coherent mass is formed. Said filler mainly contains rubber granules. Said binding agent is made on the basis of polyurethane and preferably consists of a polyurethane glue. A sound-insulating sprung floor provided with the above-mentioned insulating material and resting on a load-bearing floor, and a method for making such a floor, are also disclosed.

French Patent Application FR 2,221,465 relates to a material made from waste rubber particles, in particular waste rubber particles derived from tyres, and a synthetic elastomeric binding agent, preferably a moisture-hardening isocyanate or polyisocyanate or a two-component polyurethane. Said binding agent is of cellular structure and fills only partly the spaces between the rubber particles. The abovementioned material is said to be suitable as a floor underlay.

According to the Applicant, the sound-insulating materials as described above may have some disadvantages.

For example, when concrete is used as an air-hardening binder, the sound-insulating materials has low sound-insulating properties because of the stiffness of the concrete. On the other end, the use of isocyanates or polyisocyanates as binding agents, has to be avoided because of the toxicity of said substances which lead to risks for both the environment and the health of the operators. Moreover, in the case of fire, isocyanates, polyisocyanates or polyurethanes may release cyanidric acid.

SUMMARY OF THE INVENTION

The Applicant has now found that it is possible to make a sound-insulating load-bearing floor by applying over said load-bearing floor a sound-insulating material including at least one rubber in a subdivided form and at least one binding agent, said binding agent comprising at least one first component comprising at least one organic compound having at least one acid functional group or a derivative thereof and at least one second component comprising at least one metal oxide or hydroxide.

Said sound-insulating material also shows vibration damping properties. Moreover, said sound-insulating material allows to apply a continuous coating layer onto the surface of said load-bearing floor. Furthermore, said sound-insulating material shows a good compression resistance after hardening. Moreover, said sound-insulating material maintains its sound-insulating properties upon aging. Additionally, the binding agent used in said sound-insulating material does not contain harmful substances and does not release harmful substances in the case of fire.

According to a first aspect, the present invention relates to a method for making a sound-insulating load-bearing floor, said method comprising the following steps:

applying a sound-insulating material over a load-bearing floor so as to form a continuous coating layer;
allowing said continuous coating layer to harden;
applying a covering floor over said hardened continuous coating layer;

wherein said sound-insulating material includes:

from 40% by weight to 95% by weight, preferably from 60% by weight to 90% by weight, with respect to the total weight of the sound-insulating material, of at least one rubber in a subdivided form;
from 5% by weight to 60% by weight, preferably from 10% by weight to 40% by weight, with respect to the total weight of the sound-insulating material, of at least one binding agent comprising:
a first component comprising at least one organic compound having at least one acid functional group or a derivative thereof, said first component having a Brookfield viscosity, measured at 23° C., of from 0.1 Pa·s to 100 Pa·s, preferably of from 0.2 Pa·s to 50 Pa·s, more preferably of from 0.5 Pa·s to 20 Pa·s;
a second component comprising at least one metal oxide or hydroxide.

Said Brookfield viscosity is measured using a viscosimeter of Brookfield type, model DV3, equipped with a RV6 spindle.

According to one preferred embodiment, said method further comprises the step of applying a protective foil over said continuous coating layer. Preferably, said step is carried out after the hardening of said continuous coating layer. Preferably, said step is carried out before the application of said covering floor. Said protective foil may be selected, for example, from: polyethylene sheets, paper sheets, nylon sheets, woven-nonwoven sheets.

According to a further aspect, the present invention also relates to a sound-insulating material including:

from 40% by weight to 95% by weight, preferably from 60% by weight to 90% by weight, with respect to the total weight of the sound-insulating material, of at least one rubber in a subdivided form;
from 5% by weight to 60% by weight, preferably from 10% by weight to 40% by weight, with respect to the total weight of the sound-insulating material, of at least one binding agent comprising:
a first component comprising at least one organic compound having at least one acid functional group or a derivative thereof, said first component having a Brookfield viscosity, measured at 23° C., of from 0.1 Pa·s to 100 Pa·s, preferably of from 0.2 Pa·s to 50 Pa·s, more preferably of from 0.5 Pa·s to 20 Pa·s;
a second component comprising at least one metal oxide or hydroxide.

According to a further aspect, the present invention relates to a building structure including at least one load-bearing floor, said load-bearing floor comprising a sound-insulating material including:

from 40% by weight to 95% by weight, preferably from 60% by weight to 90% by weight, with respect to the total weight of the sound-insulating material, of at least one rubber in a subdivided form;
from 5% by weight to 60% by weight, preferably from 10% by weight to 40% by weight, with respect to the total weight of the sound-insulating material, of at least one binding agent obtained by reacting:

a first component comprising at least one organic compound having at least one acid functional group or a derivative thereof; with
a second component comprising at least one metal oxide or hydroxide.

According to one preferred embodiment, said at least one first component and said at least one second component are used in a weight ratio of from 10:90 to 90:10, preferably of from 20:80 to 80:20.

According to one preferred embodiment, said binding agent further comprises from 0% by weight to 90% by weight, preferably from 2% by weight to 70% by weight, with respect to the total weight of said binding agent, of at least one oily dispersing agent. Preferably, said oily dispersing agent has a Kinematic viscosity, at 40° C., measured according to ASTM standard D445-03, of from 10 cst to 800 cst, preferably of from 20 cst to 500 cst, more preferably of from 50 cst to 300 cst. Preferably, said oily dispersing agent is added to said second component.

According to one preferred embodiment, said binding agent further comprises from 0% by weight to 70% by weight, preferably from 10% by weight to 50% by weight, with respect to the total weight of the binding agent, of at least one bitumen. Preferably, said bitumen is added to said first component.

According to a further preferred embodiment, said binding agent further comprises from 0% by weight to 30% by weight, preferably from 1% by weight to 10% by weight, with respect to the total weight of the binding agent, of at least one polymeric material.

According to a further preferred embodiment, said binding agent further comprises from 0% by weight to 30% by weight, preferably from 1% by weight to 25% by weight, with respect to the total weight of the binding agent, of at least one inert inorganic filler.

Said sound-insulating material may be made according to different processes.

According to one preferred embodiment, the process for making a sound-insulating material comprises the following steps:

mixing said at least one rubber in a subdivided form with said at least one first component obtaining a homogeneous mixture;
mixing the obtained mixture with said at least one second component obtaining a sound-insulating material.

According to a further preferred embodiment, the process for making a sound-insulating material comprises the following steps:

mixing said at least one rubber in a subdivided form with said at least one second component obtaining a homogeneous mixture;
mixing the obtained mixture with said at least one first component obtaining a sound-insulating material.

According to a further preferred embodiment, the process for making a sound-insulating material comprises the following steps:

mixing said at least one first component with said at least one second component obtaining a homogeneous mixture;
mixing the obtained mixture with said at least one rubber in a subdivided form obtaining a sound-insulating material.

Preferably, the above reported mixing steps are carried out at a temperature of from −20° C. to 60° C., preferably of from 5° C. to 40° C., for a time of from 10 seconds to 4 hours, preferably of from 60 seconds to 30 minutes.

Preferably, in order to avoid a pre-hardening of the sound-insulating material, the above reported mixing steps are carried out not more than 48 hours, preferably from 5 minutes to 24 hours, before the step of applying said sound-insulating material.

Said mixing steps may be carried out manually for example in a bucket, or in different mixing devices such as, for example, concrete mixer, cement mixer, concrete pump, cement pump, plaster sprayer.

The step of applying a sound-insulating material may be carried according to different ways.

According to one preferred embodiment, the step of applying a sound-insulating material is carried out by spreading (for example, by means of a trowel) said sound-insulating material over said load-bearing floor.

According to a further preferred embodiment, the step of applying a sound-insulating material is carried out by spraying said sound-insulating material over said load-bearing floor.

According to a further preferred embodiment, said sound-insulating material is made and applied "in situ" working as follows:

spreading said at least one rubber in a subdivided form over said load-bearing floor;

mixing said at least one first component with said at least one second component at a temperature of from −20° C. to 60° C., preferably of from 5° C. to 40° C., for a time of from 10 seconds to 4 hours, preferably of from 60 seconds to 30 minutes, obtaining a homogeneous mixture;

spraying the obtained mixture over said spreaded rubber in a subdivided form obtaining a sound-insulating material.

According to one preferred embodiment, said continuous coating layer has a hardening time, at 23° C., of from 10 minutes to 72 hours, preferably of from 30 minutes to 24 hours.

According to one preferred embodiment, said sound-insulating material, after the hardening step, has a dynamic stiffness, measured according to standard ISO 9052-1:1989, lower than 300 MN/m$^3$, preferably lower than 150 MN/m$^3$. Usually, said dynamic stiffness is not lower than 10 MN/m$^3$. Further details about said measurement method will be reported in the examples which follow.

According to one preferred embodiment, said sound-insulating material, after the hardening step, has a sound-insulating property [expressed as a noise index (L)], measured according to standard ISO 140-8:1997, on a sample of said sound-insulating material having 10 mm thickness, not higher than 65 dB, preferably not higher than 60 dB.

According to one preferred embodiment, said continuous coating layer has a thickness of from 5 mm to 50 mm, preferably of from 10 mm to 30 mm.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

According to one preferred embodiment, the rubber in a subdivided form which may be used in the present invention, is in the form of powder or granules having a particle size in the range of from 0.1 mm to 15 mm, preferably of from 1.0 mm to 10 mm.

According to one preferred embodiment, the rubber in a subdivided form may be selected, for example, from diene elastomeric polymers or copolymers which may be of natural origin or may be obtained by solution polymerization, emulsion polymerization or gas-phase polymerization of one or more conjugated diolefins, optionally blended with at least one comonomer selected from monovinylarenes and/or polar comonomers in an amount of not more than 60% by weight.

Preferably, the diene elastomeric polymers or copolymers may be selected, for example, from: cis-1,4-polyisoprene (natural or synthetic, preferably natural rubber), 3,4-polyisoprene, polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

Alternatively, the rubber in a subdivided form may be selected from elastomeric polymers of one or more monoolefins with olefinic comonomers or derivatives thereof. Preferably, said elastomeric polymers may be selected, for example, from: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

Preferably, said rubber in a subdivided form may be obtained from a waste rubber derived from the rubber manufacturing processes. More preferably, said rubber in a subdivided form is a vulcanized rubber which may be obtained by grinding or otherwise comminuting any source of vulcanized rubber compound such as, for example, tyres, roofing membranes, hoses, gaskets, and the like, and is preferably obtained from reclaimed or scrap tyres using any conventional method. For example, the vulcanized rubber in a subdivided form may be obtained by mechanical grinding at ambient temperature or in the presence of a cryogenic coolant (i.e. liquid nitrogen). Said vulcanized rubber in a subdivided form may comprise at least one crosslinked diene elastomeric polymer or copolymer, said diene elastomeric polymer or copolymer being selected from those above reported; or at least one crosslinked elastomeric polymer of one or more monoolefins with an olefinic comonomer or derivatives thereof, said elastomeric polymer being selected from those above reported; or mixtures thereof.

According to one preferred embodiment, said organic compound having at least one acid functional group may be selected from compounds having the following general formulae (I) or (II):

R—COOH (I)

R—SO$_3$H (II)

wherein R represents a hydrocarbyl radical optionally containing at least one heteroatom such as, for example, oxygen, nitrogen, sulphur, said hydrocarbyl radical being selected, for example, from: linear or branched C$_3$-C$_{30}$ alkyl groups; linear or branched C$_2$-C$_{30}$ alkenyl groups; C$_6$-C$_{36}$ aryl groups; C$_7$-C$_{40}$ arylalkyl or alkylaryl groups; condensed or not-condensed C$_5$-C$_{30}$ cycloalkyl or cycloalkenyl groups; condensed or not-condensed C$_{10}$-C$_{30}$ polyaromatic radicals.

According to one preferred embodiment, the derivative of compounds having general formula (I) may be selected, for example, from: esters, anhydrides, halides, imides, amides, or mixtures thereof. Anhydride derivatives are particularly preferred.

According to one preferred embodiment, the derivative of compounds having general formula (II) may be selected, for example, from: sulphonates such as, for example, alkylsulphonates, arylsulphonates, alkylarylsulphonates; sulphoneamides; or mixtures thereof. Sulphonates derivatives are particularly preferred.

According to a further preferred embodiment, said organic compound having at least one acid functional group or a derivative thereof, may be selected, for example, from:
(i) carboxylic acids, in particular fatty acids such as, for example: butirric acid, lauric acid, palmitic acid, stearic acid, oleic acid, linoleic acid, ricinoleic acid, or mixtures thereof; oleic acid or mixtures thereof are particularly preferred; olein, which is a mixture of fatty acids comprising at least 60% by weight, usually of from 67% to 75% by weight, of oleic acid is still particularly preferred;
(ii) sulphonates, such as, for example, laurylsulphonate, naphthalene sulphonate, lauryl naphthalene sulphonate, dodecylbenzene sulphonate, oleil naphtahlene sulphonate, or mixture thereof; laurylsulphonate, dodecylbenzene sulphonate, oleil naphthalene sulphonate, are particularly preferred;
(iii) rosin acids or esters thereof, mixtures of rosin acids and rosin esters, said resins being optionally hydrogenated; mixtures of rosin acids and rosin esters are particularly preferred;

or mixtures thereof.

According to a further preferred embodiment, the compounds having general formulae (I) or (II) have an acid value, measured according to ASTM standard D1980-87, of from 30 mg KOH/g to 400 mg KOH/g, preferably of from 50 mg KOH/g to 300 mg KOH/g.

According to a further preferred embodiment, said organic compound containing at least one acid functional group or a derivative thereof, may be selected from thermoplastic hydrocarbon polymers in which functional groups have been introduced. Said functional groups may be selected, for example, from: carboxylic groups, anhydride groups, ester groups, or mixtures thereof. Preferably, said functional groups are present in the hydrocarbon polymer in an amount of from 0.05 parts by weight to 15 parts by weight, preferably from 0.1 parts by weight to 10 parts by weight, based on 100 parts by weight of the hydrocarbon polymer.

The functional groups may be introduced during the production of the base hydrocarbon polymer, by co-polymerization with corresponding functionalized monomers containing at least one ethylenic unsaturation, or by subsequent modification of the base hydrocarbon polymer by grafting said functionalized monomers in the presence of a free radical initiator (in particular, an organic peroxide).

In particular, the base hydrocarbon polymer may be selected, for example from:
ethylene homopolymers or copolymers of ethylene with an alpha-olefin having from 3 to 12 carbon atoms (preferably, propylene or 1-octene), comprising in general from 35 mol % to 97 mol % of ethylene and from 3 mol % to 65 mol % of alpha-olefin;
propylene homopolymers or copolymers of propylene with ethylene and/or an alpha-olefin having from 4 to 12 carbon atoms (preferably, 1-butene), the total amount of ethylene and/or alpha-olefin being less than 10 mol %;
polymers of conjugated diene monomers having from 4 to 12 carbon atoms (preferably, 1,3-butadiene, isoprene or mixtures thereof), possibly co-polymerized with a monovinylarene having from 8 to 20 carbon atoms (preferably styrene) in an amount not higher than 50% by weight;
homopolymers of monovinylarenes (in particular, styrene) or copolymers thereof with ethylene.

Functionalized monomers which may be advantageously used include, for example: monocarboxylic or, preferably, dicarboxylic acids containing at least one ethylenic unsaturation, or derivatives thereof, in particular, anhydrides or esters.

Specific examples of monocarboxylic or dicarboxylic acids containing at least one ethylenic unsaturation are: maleic acid, maleic anhydride, fumaric acid, citraconic acid, itaconic acid, acrylic acid, methacrylic acid, and anhydrides or esters derived therefrom, or mixtures thereof. Maleic anhydride is particularly preferred.

Specific examples of hydrocarbon polymer in which functional group have been introduced which may be used in the present invention and which are currently commercially available are the products known as Fusabond® (Du Pont), Orevac® (Elf Atochem), Exxelor® (Exxon Chemical), Yparex® (DSM).

According to a further preferred embodiment, said organic compound containing at least one acid functional group or a derivative thereof, may be selected from polyolefin oligomers functionalized with at least one group deriving from a dicarboxylic acid, or a derivative thereof. Preferably, said at least one group deriving from a dicarboxylic acid, or a derivative thereof, is present in the polyolefin oligomer in an amount of from 0.05 parts by weight to 15 parts by weight, preferably from 0.1 parts by weight to 10 parts by weight, based on 100 parts by weight of the polyolefin oligomer.

Said polyolefin oligomers are generally obtained by homopolymerization or copolymerization of one or more olefins containing from 2 to 16 carbon atoms, selected, for example, from:
alpha-olefins, i.e. olefins in which the double bond is in the terminal position, such as: ethylene, propylene, 1-butene, isobutene, 4-methyl-1-pentene, 1-hexene, 1-octene, 2-methyl-1-heptene, or mixture thereof;
internal monoolefins, i.e. olefins in which the double bond is not in a terminal position, such as: 2-butene, 3-pentene, 4-octene, or mixtures thereof.

Moreover, said olefins may be copolymerized with other hydrocarbons containing at least one ethylenic unsaturation, such as monovinylarenes (for example, styrene, p-methylstyrene) or conjugated dienes (for example, 1,3-butadiene, isoprene, 1,3-hexadiene).

Preferably, the polyolefin oligomers derive from the polymerization of mixtures of olefins containing 4 carbon atoms, generally containing from 35% by weight to 75% by weight of 1-butene and from 30% by weight to 60% by weight of isobutene, in the presence of a Lewis acid as catalyst, for example aluminium trichloride or boron trifluoride. These polymerization products are generally known as "polyisobutenes" since they mainly contain isobutene repeating units of formula:

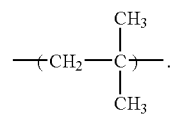

The amount of isobutene units is usually not less than 80 mol %.

The polyolefin oligomers may be functionalized by reaction with a dicarboxylic acid, or a derivative thereof. In particular, the functionalization may be carried out by:

concerted reaction of "ene" type between the polyolefin oligomer containing at least one ethylenic unsaturation and a dicarboxylic acid derivative containing at least one ethylenic unsaturation;

anionic condensation reaction between the polyolefin oligomer functionalized with a leaving group (for example a halogen atom or a tosyl or mesyl group) and a saturated dicarboxylic acid derivative.

In both cases, acyl halides (preferably chlorides or bromides), $C_1$-$C_4$ esters or, preferably, anhydrides may be used as dicarboxylic acid derivatives.

The dicarboxylic acid containing at least one ethylenic unsaturation may be selected, for example, from: maleic acid, fumaric acid, citraconic acid, itaconic acid, or mixtures thereof.

The saturated dicarboxylic acid may be selected, for example, from: malonic acid, succinic acid, glutaric acid, adipic acid, 2-hexene-1,6-dioic acid, azelaic acid, or mixtures thereof.

Preferably, the functionalized polyolefin oligomer derives from the reaction between maleic anhydride and a polyisobutene (polyisobutenyl succinic anhydride—PIBSA).

According to one preferred embodiment, said metal oxides or hydroxide may be selected, for example, from: calcium oxide, calcium hydroxide, zinc oxide, zinc hydroxide, magnesium oxide, magnesium hydroxide, potassium oxide, potassium hydroxide, iron oxide, iron hydroxide, sodium oxide, sodium hydroxide, aluminum oxide, aluminum hydroxide, or mixtures thereof. Calcium oxide, calcium hydroxide, zinc oxide, zinc hydroxide, or mixtures thereof, are particularly preferred.

As mentioned above, said binding agent may further comprise at least one oily dispersing agent.

According to one preferred embodiment, said oily dispersing agent may be selected, for example, from: mineral oils such as, for example, naphtenic oils, aromatic oils, paraffinic oils, polyaromatic oils, said mineral oils optionally containing at least one heteroatom selected from oxygen, nitrogen, sulphur; liquid paraffins; vegetable oils such as, for example, soybean oil, linseed oil, castor oil; oligomeric aromatic polyolefins; paraffinic waxes such as, for example, polyethylene waxes, polypropylene waxes; synthtetic oils such as, for example, silicone oils; alkyl benzenes (such as, for example, dodecyl benzene, di(octylbenzyl)toluene); aliphatic esters (such as, for example, tetraesters of pentaerythritol, esters of sebacic acid, phthalic esters); or mixtures thereof. Naphthenic oils, paraffinic oils are particularly preferred.

Examples of the above mentioned oily dispersing agents which may be used in the present invention and which are currently commercially available are the products known as Nytex® and Nyflex® from Nynas, Renolin® B from Fuchs.

As mentioned above, said binding agent may further comprise at least one bitumen.

The bitumen is generally selected from mixtures of heavy hydrocarbons, essentially naphthenic and paraffinic, originating from the distillation of crude oils. These products are distillation residues and are classified by their physical properties, their chemical properties varying very widely as a function of the origins of the crude. Generally, conventional crudes contain up to 30% by weight of bitumen and heavy crude up to 50% by weight. Bitumens have a variable composition of different constituents which are usually as follows:

saturated compounds, essentially paraffinic;
aromatic compounds, wherein 30% of the carbon atoms are included in aromatic cycles, with a sulphur content of around 2% to 3%;
asphaltenes, which are insoluble in hydrocarbons, are aromatic and rich in sulphur, nitrogen and oxygen; they take the form of brittle solids practically incapable of being melted.

According to one preferred embodiment, the bitumen which may be advantageously used according to the present invention is a oxidized bitumen, i.e. a bitumen whose chemical-physical properties have been substantially modified by reaction with air at elevated temperatures.

According to a further preferred embodiment, said bitumen has a softening point, measured according to ASTM standard D36-95(2000)e1, of from 30° C. to 150° C., preferably of from 50° C. to 100° C.

According to a further preferred embodiment, said bitumen has a penetration index, at 25° C., measured according to ASTM standard D5-97, of from 20 dmm to 300 dmm, preferably of from 50 dmm to 100 dmm.

Example of bitumen which may be used in the present invention and which is currently commercially available is the product known as Sibox® 60/85 from Siba.

According to one preferred embodiment, said binding agent, as mentioned above, may further comprise at least one polymeric material.

According to one preferred embodiment, said polymeric material may be selected, for example, from: polyethylene (PE), low density PE (LDPE), medium density PE (MDPE), high density PE (HDPE) and linear low density PE (LLDPE); amorphous polyolefins (APOs); polypropylene (PP); ethylene-propylene rubber (EPR), ethylene-propylene copolymer (EPM), ethylene-propylene-diene terpolymer (EPDM); natural rubber; butyl rubber; ethylene/vinyl acetate (EVA) copolymer; polystyrene; ethylene/acrylate copolymer, ethylene/methyl acrylate (EMA) copolymer, ethylene/ethyl acrylate (EEA) copolymer, ethylene/butyl acrylate (EBA) copolymer; ethylene/α-olefin copolymer; acrylonitrile-butadiene-styrene (ABS) resins; halogenated polymer, polyvinyl chloride (PVC); polyurethane (PUR); polyamide; aromatic polyester, polyethylene terephthalate (PET), polybutylene terephthalate (PBT); and copolymers or mechanical mixtures thereof.

According to a further preferred embodiment, said polymeric material, may be selected, for example, from thermoplastic elastomers comprising a continuous matrix of a thermoplastic polymer, e.g. polypropylene, and fine particles (generally having a diameter of the order of from 1 µm to 10 µm) of a cured elastomeric polymer, e.g. crosslinked EPR or EPDM, dispersed in the thermoplastic matrix. The elastomeric polymer may be incorporated in the thermoplastic matrix in the uncured state and then dynamically crosslinked during processing by addition of a suitable amount of a crosslinking agent. Alternatively, the elastomeric polymer may be cured separately and then dispersed into the thermoplastic matrix in the form of fine particles. Thermoplastic elastomers of this type are described, for example, in U.S. Pat. No. 4,104,210, or in European Patent Application EP 324, 430.

According to a further preferred embodiment, said polymeric material may be selected, for example, from styrene block copolymers or terpolymers with different olefins and/or with dienes, such as, for example, with butene, ethylene, propylene, isoprene, butadiene.

Specific examples of said styrene block copolymers or terpolymers are: styrene-butadiene-styrene (S-B-S), styrene-isoprene-styrene (S-I-S) and styrene-ethylene/butene-styrene (S-EB-S) triblock polymers; styrene-ethylene/propylene (S-EP) and styrene-ethylene/butene (S-EB) diblock polymers; styrene-butadiene or styrene-isoprene branched polymers, or mixtures thereof. Styrene block copolymers or terpolymers are particularly preferred.

Examples of polymeric materials which may be used in the present invention and which are currently commercially available are the products known as Kraton® from Kraton Polymer, Eastoflex® from Eastman, Rextac® from Huntsman.

According to one preferred embodiment, said binding agent, as mentioned above, may further comprise at least one inert inorganic filler.

According to one preferred embodiment, said inert inorganic filler may be selected, for example, from: sand, silica, calcium carbonate, calcium silicates, barium sulfates, talc, mica, carbon black, or mixtures thereof. Silica, calcium carbonate, or mixtures thereof, are particularly preferred.

BRIEF DESCRIPTION OF THE DRAWING

The present invention will now be illustrated in further detail by means of the attached FIG. 1 which represents a schematic cross section of a portion of a load-bearing floor comprising a homogeneous coating layer made from the sound-insulating material according to an embodiment of the present invention.

DETAILED DESCRIPTION OF THE INVENTION

Figure 1:
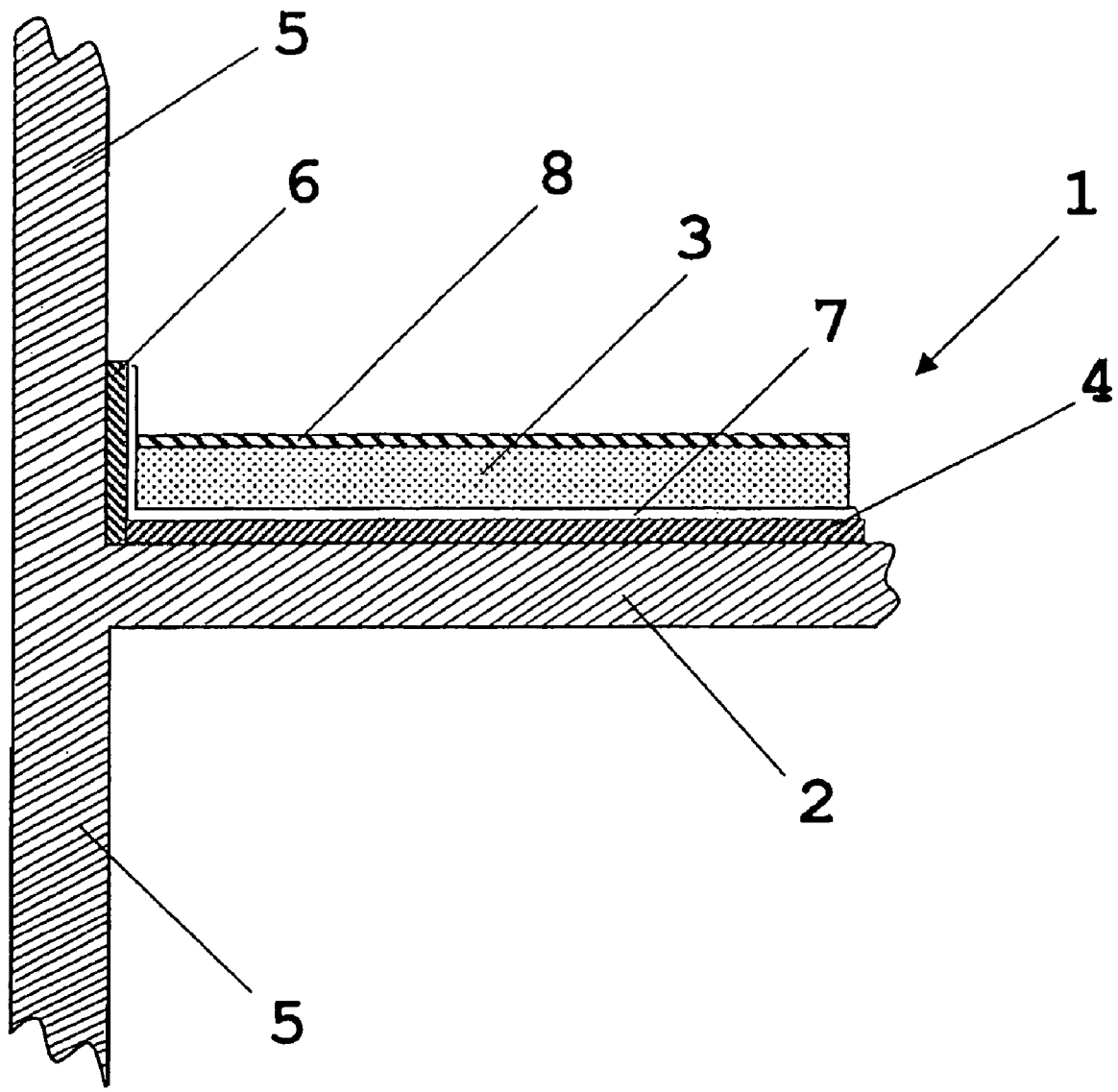

A sprung floor 1 is provided on top of a load-bearing floor 2 associated with the walls 5. Said sprung floor 1 comprises a covering floor 3 which rests on a continuous coating layer 4 made from the sound-insulating material according to the present invention and which does not have any direct contact with said load-bearing floor 2 or with the walls 5; Preferably, said continuous coating layer 4 has a thickness of from 5 mm to 50 mm, more preferably of from 7 mm to 30 mm.

According to FIG. 1 the continuous coating layer 6 is separated from the walls 5 by means of a stranding strip 6, said stranding strip 6 usually made of a sound-insulating material such as, for example, polyethylene foam, polyurethane foam, rubber granules with a polyurethane glue as a binding agent. Alternatively, said stranding strip 6 may be made from the sound-insulating material according to the present invention.

Alternatively, said continuous coating layer 4 horizontally extends over the load-bearing floor 2 up against the surrounding walls 5 (not represented in FIG. 1) and the above-mentioned standing strip 6 rests on the edges of the continuous coating layer 4 (not represented in FIG. 1).

Alternatively, the continuous coating layer 4 extends both horizontally and vertically over the load-bearing floor 2 up against the surrounding walls 5 (not represented in FIG. 1).

Preferably, the stranding strip 6 vertically extends from the load-bearing floor 2 up to the covering floor 3 and it has a thickness of from 2 mm to 20 mm, preferably of from 3 mm to 10 mm.

Optionally, in order to protect the continuous coating layer 4 during the manufacturing of the sprung floor 1, a protective foil 7 is provided over said continuous coating layer 4 and it is folded up against the walls 5 on the edges of the sprung floor 1.

The covering floor 3 is usually made from a hardened composition mainly comprising sand and cement, as is generally known for making fixed floors.

Further, a metal spot-welded wire netting (not represented in FIG. 1) is preferably inserted in the covering floor 3.

Said covering floor 3 extends up to under the top edge of the above-mentioned standing strip 6 so that, consequently, there is no contact between the surrounding walls 5 and the covering floor 3.

Preferably, said covering floor has a thickness of from 2 cm to 10 cm, more preferably of from 4 cm to 6 cm. Depending on the expected load of the floor, this thickness may possibly be adjusted.

To sum up, the sprung-floor 1 comprises a covering floor 3 in the shape of a rigid plate whose perimeter is practically entirely enclosed by said standing strip 6 and a continuous coating layer 4, whereby the whole rests on the fixed load-bearing floor 2.

Usually, over said covering floor 3, after it has been hardened, a layer of a finishing material 8 (such as, tiles, wood), is placed.

The present invention will be further illustrated below by means of a number of preparation examples, which are given for purely indicative purposes and without any limitation of this invention.

Example 1

Preparation of the Sound-Insulating Material

First Component 35 g of bitumen (Sibox® 60/85 from Siba) were added into a 2 liter beaker, was heated under stirring up to 180° C. and was maintained at this temperature until the bitumen was completely fluid.

The temperature of the mixture was then reduced to 150° C. and 23.5 g of olein (bidistilled animal olein from Balestrini Chimica) which is a mixture comprising a major portion of oleic acid (of from 67% to 75% by weight), having an acid value of from 196 mg KOH/g to 204 mg KOH/g, were added to the mixture. The stirring was continued until a homogeneous mixture was obtained. Then, the temperature of the mixture was reduced to 120° C. and 41.5 g of resin oil (mixture of rosin acids and esters, SL75 type from Lombardi) having an acid number of from 60 mg KOH/g to 90 mg KOH/g, were added to the mixture. The stirring was continued until a homogeneous mixture was obtained.

When the mixing was complete, the mixture was allowed to cool, under gentle stirring, to room temperature (23° C.). The thus obtained first component was a liquid, having a Brookfield viscosity of 2 Pa·s, measured at 23° C., using a viscosimeter of Brookfield type, model DV3, equipped with a RV6 spindle. The obtained first component was packaged into plastic buckets.

Second Component 46.0 g of a mineral oil (Renolin® B20 from Fuchs) having a Kinematic viscosity, at 40° C., of 66 cSt, 12.8 g of calcium oxide, 21.3 g of powdered calcium hydroxide, 19.7 g of calcium carbonate and 0.2 g??? of silica, were added to a 2 liter beaker; the mixture was subjected to a fast stirring (500 rpm) at room temperature (23° C.). Stirring was continued until a soft and fluid cream was obtained that was packaged in plastic buckets.

Sound-Insulating Material

80% by weight (% by weight with respect to the total weight of the sound-insulating material) of a vulcanized rubber (ground waste rubber from scrap tyres having an average diameter of from 4 mm to 7 mm commercialized by Transeco) was mixed, under stirring, in a 5 liters beaker, with the first component obtained as above reported, at room temperature (23° C.), until a homogeneous dispersion was obtained. Then, the second component obtained as above reported was added and the mixture was stirred at room temperature (23° C.), until a homogeneous dispersion was obtained. The first component and the second component were used in a weight ratio reported in Table 1; the total amount of the binding agent present in the sound-insulating material was equal to 20% by weight with respect to the total weight of the sound-insulating material.

The so obtained sound-insulating material was subjected to the following tests.

Dynamic Stiffness

The dynamic stiffness was measured according to standard ISO 9052-1:1989.

To this aim, the so obtained sound-insulating material was spreaded over a polyethylene sheet and was allowed to harden at room temperature (23° C.), for 48 hours. A sample of the sound-insulating material having the following dimensions: 20 cm×20 cm×1 cm was removed from the above polyethylene sheet and was subjected to the dynamic stiffness measurement.

The obtained sample was placed between two metal plates which were maintained at the following conditions: 23° C., 50% of humidity. The upper plate was a 8 kg load plate corresponding to a load of 200 kg/m² that is the typical weight of the load bearing floor. The plate was subjected to an impulse frequency of from 50 Hz to 200 Hz: said impulse was generated by a generator and transferred to the upper plate by a shaker. The vibrational acceleration was measured by an accelerometer placed on the upper plate.

The dynamic stiffness was calculated according to the standard above reported and the obtained data, expressed in $MN/m^3$, were given in Table 1.

Sound-Insulation Performance Test

The test was performed according to standard ISO 140-8: 1997.

To this aim the sound-insulating material obtained as disclosed above was spreaded over a 10 m² of a standard load bearing floor to obtain a continuous layer having 10 mm thickness and was let to harden at room temperature (23° C.). After 24 hours the standard cement covering floor was applied. The acoustic measurements were performed after 28 days and the obtained data, expressed as a noise index (L), were given in Table 1.

Example 2

Preparation of the Sound-Insulating Material

First Component 36.4 g of bitumen (Sibox® 60/85 from Siba) were added into a 2 liter beaker, was heated under stirring up to 180° C. and was maintained at this temperature until the bitumen was completely fluid.

The temperature of the mixture was then reduced to 150° C. and 54.6 g of olein (bidistilled animal olein from Balestrini Chimica) which is a mixture comprising a major portion of oleic acid (of from 67% to 75% by weight), having an acid value of from 196 mg KOH/g to 204 mg KOH/g, were added to the mixture. The stirring was continued until a homogeneous mixture was obtained. Then, the temperature of the mixture was reduced to 120° C. and 9.0 g of a naphthenic oil (Nyflex® 820 from Nynas) having a Kinematic viscosity, at 40° C., of 110 cSt were added and the mixture was maintained under stirring.

When the mixing was complete, the mixture was allowed to cool, under gentle stirring, to room temperature (23° C.). The thus obtained first component was a liquid, having a Brookfield viscosity of 1 Pa·s, measured at 23° C., using a viscosimeter of Brookfield type, model DV3, equipped with a RV6 spindle. The obtained first component was packaged into plastic buckets.

Second Component 50.0 g of a naphthenic oil (Nyflex® 820 from Nynas) having a Kinematic viscosity, at 40° C., of 110 cSt, 20.0 g of calcium oxide and 30.0 g of powdered calcium hydroxide, were added to a 2 liter beaker: the mixture was subjected to a fast stirring (500 rpm), at room temperature (23° C.). Stirring was continued until a soft and fluid cream was obtained that was packaged in plastic buckets.

Sound-Insulating Material

The sound-insulating material and the tests were carried out as above reported in Example 1. The obtained data were given in Table 1.

Example 3

Preparation of the Sound-Insulating Material

First Component 33.0 g of bitumen (Sibox® 60/85 from Siba) were added into a 2 liter beaker, was heated under stirring up to 180° C. and was maintained at this temperature until the bitumen was completely fluid. At this temperature, 5.0 g of a styrene-butadiene-styrene block copolymer (Kraton® D 1101 from Kraton Polymer) were added under stirring.

The temperature of the mixture was then reduced to 150° C. and 54.0 g of olein (bidistilled animal olein from Balestrini Chimica) which is a mixture comprising a major portion of oleic acid (of from 67% to 75% by weight), having an acid value of from 196 mg KOH/g to 204 mg KOH/g, was added to the mixture. The stirring was continued until a homogeneous mixture was obtained. Then, the temperature of the mixture was reduced to 120° C. and 9.0 g of a naphthenic oil (Nyflex® 820 from Nynas) having a Kinematic viscosity, at 40° C., of 110 cSt, were added and the mixture was maintained under stirring.

When the mixing was complete, the mixture was allowed to cool, under gentle stirring, to room temperature (23° C.). The thus obtained first component was a liquid, having a Brookfield viscosity of 1 Pa·s, measured at 23° C., using a viscosimeter of Brookfield type, model DV3, equipped with a RV6 spindle. The obtained first component was packaged into plastic buckets.

Second Component 50.0 g of a naphthenic oil (Nyflex® 820 from Nynas) having a Kinematic viscosity, at 40° C., of 110 cst, 20.0 g of calcium oxide and 30.0 g??? of powdered calcium hydroxide, were added to a 2 liter beaker: the mixture was subjected to a fast stirring (500 rpm) at room temperature (23° C.). Stirring was continued until a soft and fluid cream was obtained that was packaged in plastic buckets of various capacities.

Sound-Insulating Material

The sound-insulating material and the tests were carried out as above reported in Example 1. The obtained data were given in Table 1.

Example 4

Preparation of the Sound-Insulating Material

First Component 50.0 g of olein (bidistilled animal olein from Balestrini Chimica) which is a mixture comprising a major portion of oleic acid (of from 67% to 75% by weight), having an acid value of from 196 mg KOH/g to 204 mg KOH/g, were added into a 2 liter beaker and was heated under stirring up to 70° C. Then, 50.0 g of polyisobutenyl succinic anhydride (PIBSA—7.5 parts by weight of a succinic anhydride functional group based on 100 parts of polyisobutene), were added. The stirring was continued until a homogeneous mixture was obtained.

When the mixing was complete, the mixture was allowed to cool, under gentle stirring, to room temperature (23° C.). The thus obtained first component was a liquid, having a Brookfield viscosity of 3 Pa·s, measured at 23° C., using a viscosimeter of Brookfield type, model DV3, equipped with a RV6 spindle. The obtained first component was packaged into plastic buckets.

Second Component 50.0 g of a naphthenic oil (Nyflex® 820 from Nynas) having a Kinematic viscosity, at 40° C., of 110 cSt, 20.0 g of calcium oxide and 30.0 g of powdered calcium hydroxide, were added to a 2 liter beaker: the mixture was subjected to a fast stirring (500 rpm???) at room temperature (23° C.). Stirring was continued until a soft and fluid cream was obtained that was packaged in plastic buckets.

Sound-Insulating Material

The sound-insulating material and the tests were carried out as above reported in Example 1. The obtained data were given in Table 1.

TABLE 1

| EXAMPLES | 1 | 2 | 3 | 4 |
|---|---|---|---|---|
| First component/Second component ratio | 77/23 | 70/30 | 70/30 | 70/30 |
| Dynamic stiffness (MN/m$^3$) | 33 | 30 | 28 | 56 |
| (L) (dB) | 61 | 59 | 58 | 64 |

The invention claimed is:

1. A method for making a sound-insulating load-bearing floor comprising:
    applying a sound-insulating material over a load-bearing floor so as to form a continuous coating layer;
    allowing said continuous coating layer to harden; and
    applying a covering floor over said hardened continuous coating layer,
    wherein said sound-insulating material comprises:
        40% by weight to 95% by weight, with respect to the total weight of the sound-insulating material, of at least one rubber in a subdivided form; and
        5% by weight to 60% by weight, with respect to the total weight of the sound-insulating material, of at least one binding agent comprising:
            a first component comprising at least one organic compound having at least one acid functional group or a derivative thereof, said first component having a Brookfield viscosity, measured at 23° C., of 0.1 to Pa·s to 100 Pa·s; and
            a second component comprising at least one metal oxide or hydroxide,
    wherein said sound-insulating material, after hardening, has a dynamic stiffness, measured according to standard ISO 9052-1:1989, lower than 300 MN/m$^3$.

2. The method for making a sound-insulating load-bearing floor according to claim 1, wherein said sound-insulating material comprises 60% by weight to 90% by weight, with respect to the total weight of the sound-insulating material, of at least one rubber in a subdivided form.

3. The method for making a sound-insulating load-bearing floor according to claim 1, wherein said sound-insulating material comprises 10% by weight to 40% by weight, with respect to the total weight of the sound-insulating material, of at least one binding agent.

4. The method for making a sound-insulating load-bearing floor according to claim 1, wherein said first component has a Brookfield viscosity, measured at 23° C., of 0.2 Pa·s to 50 Pa·s.

5. The method for making a sound-insulating load-bearing floor according to claim 4, wherein said first component has a Brookfield viscosity, measured at 23° C. of 0.5 Pa·s to 20 Pa·s.

6. The method for making a sound-insulating load-bearing floor according to claim 1, wherein said method further comprises applying a protective foil over said continuous coating layer.

7. The method for making a sound-insulating load-bearing floor according to claim 1, wherein said at least one first component and said at least one second component are used in a weight ratio of 10:90 to 90:10.

8. The method for making a sound-insulating load-bearing floor according to claim 7, wherein said at least one first component and said at least one second component are used in a weight ratio of 20:80 to 80:20.

9. The method for making a sound-insulating load-bearing floor according to claim 1, wherein said sound-insulating material is made according to a process comprising:
    mixing said at least one rubber in a subdivided form with said at least one first component to obtain a homogeneous mixture; and
    mixing the homogeneous mixture with said at least one second component to obtain a sound-insulating material.

10. The method for making a sound-insulating load-bearing floor according to claim 1, wherein said sound-insulating material is made according to a process comprising:
    mixing said at least one rubber in a subdivided form with said at least one second component to obtain a homogeneous mixture; and
    mixing the homogeneous mixture with said at least one first component to obtain a sound-insulting material.

11. The method for making a sound-insulating load-bearing floor according to claim 1, wherein said sound-insulating material is made according to a process comprising:
    mixing said at least one first component with said at least one second component to obtain a homogeneous mixture; and
    mixing the homogeneous mixture with said at least one rubber in a subdivided form to obtain a sound-insulating material.

12. The method for making a sound-insulating load-bearing floor according to claim 9, wherein said mixing steps are carried out at a temperature of −20° C. to 60° C., for 10 seconds to 4 hours.

13. The method for making a sound-insulating load-bearing floor according to claim 9, wherein said mixing steps are carried out not more than 48 hours before the step of applying said sound-insulating material.

14. The method for making a sound-insulating load-bearing floor according to claim 13, wherein said mixing steps are carried out from 5 minutes to 24 hours before the step of applying said sound-insulating material.

15. The method for making a sound-insulating load-bearing floor according to claim 1, wherein said applying the sound-insulating material is carried out by spreading said sound-insulating material over said load-bearing floor.

16. The method for making a sound-insulating load-bearing floor according to claim 1, wherein applying the sound-insulating material is carried out by spraying said sound-insulating material over said load-bearing floor.

17. The method for making a sound-insulating load-bearing floor according to claim 1, wherein said sound-insulating material is made and applied "in situ" working as follows:
  spreading said at least one rubber in a subdivided form over said load-bearing floor;
  mixing said at least one first component with said at least one second component at a temperature of −20° C. to 60° C., for 10 seconds to 4 hours, to obtain a homogeneous mixture; and
  spraying the homogeneous mixture over said spread rubber in a subdivided form to obtain a sound-insulating material.

18. The method for making a sound-insulating load-bearing floor according to claim 1, wherein said continuous coating layer has a hardening time, at 23° C., of 10 minutes to 72 hours.

19. The method for making a sound-insulating load-bearing floor according to claim 18, wherein said continuous coating layer has a hardening time, at 23° C., of 30 minutes to 24 hours.

20. The method for making a sound-insulating load-bearing floor according to claim 1, wherein said sound-insulating material, after the hardening step, has a dynamic stiffness, measured according to standard ISO 9052-1:1989, lower than 150 MN/m$^3$.

21. The method for making a sound-insulating load-bearing floor according to claim 1, wherein said sound-insulating material, after the hardening step, has a dynamic stiffness, measured according to standard ISO 9052-1:1989, not lower than 10 MN/m$^3$.

22. The method for making a sound-insulating load-bearing floor according to claim 1, wherein said sound-insulating material, after the hardening step, has a sound-insulating property, expressed as a noise index, measured according to standard ISO 140-8:1997, on a sample of said sound-insulating material having 10 mm thickness, not higher than 65 dB.

23. The method for making a sound-insulating load-bearing floor according to claim 22, wherein said sound-insulating material, after the hardening step, has a sound-insulating property, expressed as a noise index, measured according to ISO 140-8:1997, on a sample of said sound-insulating material having 10 mm thickness, not higher than 60 dB.

24. The method for making a sound-insulating load-bearing floor according to claim 1, wherein said continuous coating layer has a thickness of 5 mm to 50 mm.

25. The method for making a sound-insulating load-bearing floor according to claim 24, wherein said continuous coating layer has a thickness of 10 mm to 30 mm.

26. The method for making a sound-insulating load-bearing floor according to claim 1, wherein said rubber in a subdivided form is in the form of powder or granules having a particle size of 0.1 mm to 15 mm.

27. The method for making a sound-insulating load-bearing floor according to claim 1, wherein said rubber in a subdivided form is selected from: cis-1,4-polyisoprene, 3,4-polyisoprene, polybutadiene, optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

28. The method for making a sound-insulating load-bearing floor according to claim 1, wherein said rubber in a subdivided form is selected from: ethylene/propylene copolymers or ethylene/propylene/diene copolymers; polyisobutene; butyl rubbers; halobutyl rubbers, chlorobutyl or bromobutyl rubbers; or mixtures thereof.

29. The method for making a sound-insulating load-bearing floor according to claim 1, wherein said rubber in a subdivided form is a vulcanized rubber.

30. The method for making a sound-insulating load-bearing floor according to claim 1, wherein said organic compound having at least one acid functional group is selected from compounds having the following general formulae (I) or (II) or a derivative thereof:

R—COOH      (I)

R—SO$_3$H      (II)

wherein R represents a hydrocarbyl radical optionally containing at least one heteroatom, oxygen, nitrogen, or sulphur, said hydrocarbyl radical being selected from: linear or branched $C_3$-$C_{30}$ alkyl groups; linear or branched $C_2$-$C_{30}$ alkenyl groups; $C_6$-$C_{36}$ aryl groups; $C_7$-$C_{40}$ arylalkyl or alkylaryl groups; condensed or not-condensed $C_5$-$C_{30}$ cycloalkyl or cycloalkenyl groups; and condensed or not-condensed $C_{10}$-$C_{30}$ polyaromatic radicals.

31. The method for making a sound-insulating load-bearing floor according to claim 30, wherein the derivative of said compounds having general formula (I) is selected from: esters, anhydrides, halides, imides, amides, or mixtures thereof.

32. The method for making a sound-insulating load-bearing floor according to claim 30, wherein the derivative of said compounds having general formula (II) is selected from: sulphonates, alkylsulphonates, arylsulphonates, alkylarylsulphonates; sulphoneamides, or mixtures thereof.

33. The method for making a sound-insulating load-bearing floor according to claim 30, wherein the compounds having general formulae (I) or (II) have an acid value, measured according to ASTM standard D1980-87, of 30 mg KOH/g to 400 mg KOH/g.

34. The method for making a sound-insulating load-bearing floor according to claim 1, wherein said organic compound having at least one acid functional group is selected from thermoplastic hydrocarbon polymers in which functional groups selected from: carboxylic groups, anhydride groups, ester groups, or mixtures thereof, have been introduced.

35. The method for making a sound-insulating load-bearing floor according to claim 34, wherein said functional groups are present in the hydrocarbon polymer in an amount of 0.05 parts by weight to 15 parts by weight based on 100 parts by weight of the hydrocarbon polymer.

36. The method for making a sound-insulating load-bearing floor according to claim 1, wherein said organic compound having at least one acid functional group or a derivative thereof is selected from polyolefin oligomers functionalized with at least one group deriving from a dicarboxylic acid, or a derivative thereof.

37. The method for making a sound-insulating load-bearing floor according to claim 36, wherein said at least one group deriving from a dicarboxylic acid or a derivative thereof, is present in the polyolefin oligomer in an amount of 0.05 parts by weight to 15 parts by weight based on 100 parts by weight of the polyolefin oligomer.

38. The method for making a sound-insulating load-bearing floor according to claim 1, wherein said metal oxide or hydroxide is selected from: calcium oxide, calcium hydroxide, zinc oxide, zinc hydroxide, magnesium oxide, magnesium hydroxide, potassium oxide, potassium hydroxide, iron oxide, iron hydroxide, sodium oxide, sodium hydroxide, aluminum oxide, aluminum hydroxide, or mixtures thereof.

39. The method for making a sound-insulating load-bearing floor according to claim 1, wherein said binding agent further comprises 0% by weight to 90% by weight, with respect to the total weight of said binding agent, or at least one oily dispersing agent.

40. The method for making a sound-insulating load-bearing floor according to claim 39, wherein said at least one oily dispersing agent has a Kinematic viscosity, at 40° C., measured according to ASTM standard D445-03, of 20 cst to 500 cst.

41. The method for making a sound-insulating load-bearing floor according to claim 39, wherein said oily dispersing agent is selected from: mineral oils, naphthenic oils, aromatic oils, paraffinic oils, polyaromatic oils, said mineral oils optionally containing at least one heteroatom selected from oxygen, nitrogen, sulphur; liquid paraffins; vegetable oils, soybean oil, linseed oil, castor oil; oligomeric aromatic polyolefins; paraffinic waxes, polyethylene waxes, polypropylene waxes; synthetic oils, silicone oils; alkyl benzenes, dodecyl benzene, di(octylbenzyl)toluene; aliphatic esters, tetraesters of pentaerythritol, esters of sebacic acid, phthalic esters; or mixtures thereof.

42. The method for making a sound-insulating load-bearing floor according to claim 1, wherein said binding agent further comprises 0% by weight to 70% by weight, with respect to the total weight of the binding agent, of at least one bitumen.

43. The method for making a sound-insulating load-bearing floor according to claim 42, wherein said bitumen has a softening point, measured according to ASTM standard D36-95 (2000) el, of 30° C. to 150° C.

44. The method for making a sound-insulating load-bearing floor according to claim 42, wherein said bitumen has a penetration index, at 25° C., measured according to ASTM standard D5-97, of 20 dmm to 300 dmm.

45. The method for making a sound-insulating load-bearing floor according to claim 1, wherein said binding agent further comprises 0% by weight to 30% by weight, with respect to the total weight of the binding agent, of at least one polymeric material.

46. The method for making a sound-insulating load-bearing floor according to claim 45, wherein said polymeric material is selected from styrene block copolymers or terpolymers, styrene-butadiene-styrene, styrene-isoprene-styrene, and styrene-ethylene/butene-styrene triblock polymers; styrene-ethylene/propylene and styrene-ethylene/butene diblock polymers; styrene-butadiene or styrene-isoprene branched polymers, or mixtures thereof.

47. The method for making a sound-insulating load-bearing floor according to claim 1, wherein said binding agent further comprises 0% by weight to 30% by weight with respect to the total weight of the binding agent, of at least one inert inorganic filler.

48. The method for making a sound-insulating load-bearing floor according to claim 47, wherein said inert inorganic filler is selected from: sand, silica, calcium carbonate, calcium silicates, barium sulfates, talc, mica, carbon black, or mixtures thereof.

49. A sound-insulating material comprising:
   40% by weight to 95% by weight, with respect to the total weight of the sound-insulating material, of at least one rubber in a subdivided form; and
   5% by weight to 60% by weight, with respect to the total weight of the sound-insulating material, of at least one binding agent comprising:
      a first component comprising at least one organic compound having at least one acid functional group or a derivative thereof, said first component having a Brookfield viscosity, measured at 23° C., of 0.1 Pa·s to 100 Pa·s; and
      a second component comprising at least one metal oxide or hydroxide,
   wherein said sound-insulating material, after hardening, has a dynamic stiffness, measured according to standard ISO 9052-1:1989, lower than 300 MN/m³.

50. The sound-insulating material according to claim 49, wherein said at least one rubber in a subdivided form is in the form of powder or granules having a particle size in the range of 0.1 mm to 15 mm.

51. The sound-insulating material according to claim 49, wherein said at least one rubber in a subdivided form is selected from: cis-1,4-polyisoprene, 3,4-polyisoprene, polybutadiene, optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof; or
   wherein said at least one rubber in a subdivided form is selected from: ethylene/propylene copolymers or ethylene/propylene/diene copolymers; polyisobutene, butyl rubbers; halobutyl rubbers, chlorobutyl rubbers or bromobutyl rubbers; or mixtures thereof; or
   wherein said at least one rubber in a subdivided form is a vulcanized rubber.

52. The sound-insulating material according to claim 49, wherein said at least one organic compound having at least one acid functional group or a derivative thereof is selected from compounds having the following general formulae (I) or (II) or derivatives thereof:

R—COOH  (I)

R—SO₃H  (II)

wherein R represents a hydrocarbyl radical optionally containing at least one heteroatom, oxygen, nitrogen, or sulphur, said hydrocarbyl radical being selected from: linear or branched $C_3$-$C_{30}$ alkyl groups; linear or branched $C_2$-$C_{30}$ alkenyl groups; $C_6$-$C_{36}$ aryl groups; $C_7$-$C_{40}$ arylalkyl or alkylaryl groups; condensed or not-condensed $C_5$-$C_{30}$ cycloalkyl or cycloalkenyl groups; and condensed or not-condensed $C_{10}$-$C_{30}$ polyaromatic radicals.

53. The sound-insulating material according to claim 49, wherein said organic compound having at least one acid functional group is selected from thermoplastic hydrocarbon polymers in which functional groups selected from: carboxylic groups, anhydride groups, ester groups, or mixtures thereof, have been introduced; or wherein said organic compound having at least one acid functional group or a derivative thereof is selected from polyolefin oligomers functionalized with at least one group deriving from a dicarboxylic acid, or a derivative thereof.

54. The sound-insulating material according to claim 49 wherein said at least one metal oxide or hydroxide is selected from: calcium oxide, calcium hydroxide, zinc oxide, zinc hydroxide, magnesium oxide, magnesium hydroxide, potassium oxide, potassium hydroxide, iron oxide, iron hydroxide, sodium oxide, sodium hydroxide, aluminum hydroxide, or mixtures thereof.

55. The sound-insulating material according to claim 49 wherein said binding agent further comprises at least one oily dispersing agent selected from: mineral, naphthenic oils, aromatic oils, paraffinic oils, polyaromatic oils, said mineral oils optionally containing at least one heteroatom selected from oxygen, nitrogen, or sulphur; liquid paraffins; vegetable oils, soybean oil, linseed oil, castor oil; oligomeric aromatic polyolefins; paraffinic waxes, polyethylene waxes, polypropylene waxes, synthetic oils, silicone oils, alkyl benzenes, dodecyl benzene, di(octylbenzyl)toluene; aliphatic esters, tetraesters of pentaerythritol, esters of sebacic acid, phthalic esters; or mixtures thereof.

56. The sound-insulating material according to claim 49 wherein said binding agent further comprises 0% by weight to 70% by weight, with respect to the total weight of the binding agent, of at least one bitumen.

57. The sound-insulating material according to claim 49, wherein said binding agent further comprises from 0% by weight to 30% by weight, with respect to the total weight of the binding agent, of at least one polymeric material; styrene block copolymers or terpolymers, styrene-butadiene-styrene, styrene-isoprene-styrene and styrene-ethylene/butene-styrene triblock polymers; styrene-ethylene/propylene and styrene-ethylene/butene diblock polymers; styrene-butadiene or styrene-isoprene branched polymers, or mixtures thereof.

58. The sound-insulating material according to claim 49, wherein said binding agent further comprises 0% by weight to 30% by weight with respect to the total weight of the binding agent, of at least one inert inorganic filler; sand, silica, calcium carbonate, calcium silicates, barium sulfates, talc, mica, carbon black, or mixtures thereof.

59. A building structure comprising at least one load-bearing floor, said load-bearing floor comprising a sound-insulating material comprising:

40% by weight to 95% by weight with respect to the total weight of the sound-insulating material of at least one rubber in a subdivided form; and 5% by weight to 60% by weight with respect to the total weight of the sound-insulating material of at least one binding agent obtained by reacting:

a first component comprising at least one organic compound having at least one acid functional group or a derivative thereof, said first component having a Brookfield viscosity, measured at 23° C., of 0.1 Pa·s to 100 Pa·s; and a second component comprising at least one metal oxide or hydroxide, wherein said sound-insulating material, after hardening, has a dynamic stiffness, measured according to standard ISO 9052-1:1989, lower than 300 MN/m³.

60. The building structure according to claim 59, wherein said at least one rubber in a subdivided form is in the form of power or granules having a particle size in the range of 0.1 mm to 15 mm.

61. The building structure according to claim 59, wherein said at least one rubber in a subdivided form is selected from: cis-1,4-polyisoprene, 3,4-polyisoprene, polybutadiene, optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof; or wherein said at least one rubber in a subdivided form is selected from: ethylene/propylene copolymers or ethylene/propylene/diene copolymers; polyisobutene, butyl rubbers; halobutyl rubbers, chlorobutyl rubbers or bromobutyl rubbers; or mixtures thereof; or wherein said at least one rubber in a subdivided form is a vulcanized rubber.

62. The building structure according to claim 59, wherein said at least one organic compound having at least one acid functional group or a derivative thereof is selected from compounds having the following general formulae (I) or (II) or derivatives thereof:

$$R\text{—}COOH \quad (I)$$

$$R\text{—}SO_3H \quad (II)$$

wherein R represents a hydrocarbyl radical optionally containing at least one heteroatom, oxygen, nitrogen, or sulphur, said hydrocarbyl radical being selected from: linear or branched $C_3$-$C_{30}$ alkyl groups; linear or branched $C_2$-$C_{30}$ alkenyl groups; $C_6$-$C_{36}$ aryl groups; $C_7$-$C_{40}$ arylalkyl or alkylaryl groups; condensed or not-condensed $C_5$-$C_{30}$ cycloalkyl or cycloalkenyl groups; and condensed or not-condensed $C_{10}$-$C_{30}$ polyaromatic radicals.

63. The building structure according to claim 59, wherein said organic compound having at least one acid functional group is selected from thermoplastic hydrocarbon polymers in which functional groups selected from: carboxylic groups, anhydride groups, ester groups, or mixtures thereof, have been introduced; or wherein said organic compound having at least one acid functional group or a derivative thereof is selected from polyolefin oligomers functionalized with at least one group deriving from a dicarboxylic acid, or a derivative thereof.

64. The building structure according to claim 59, wherein said at least one metal oxide or hydroxide is selected from: calcium oxide, calcium hydroxide, zinc oxide, zinc hydroxide, magnesium oxide, magnesium hydroxide, potassium oxide, potassium hydroxide, iron oxide, iron hydroxide, sodium oxide, sodium hydroxide, aluminum hydroxide, or mixtures thereof.

65. The building structure according to claim 59, wherein said binding agent further comprises at least one oily dispersing agent selected from: mineral, naphthenic oils, aromatic oils, paraffinic oils, polyaromatic oils, said mineral oils optionally containing at least one heteroatom selected from oxygen, nitrogen, or sulphur; liquid paraffins; vegetable oils, soybean oil, linseed oil, castor oil; oligomeric aromatic polyolefins; paraffinic waxes, polyethylene waxes, polypropylene waxes, synthetic oils, silicone oils, alkyl benzenes, dodecyl benzene, di(octylbenzyl)toluene); aliphatic esters, tetraesters of pentaerythritol, esters of sebacic acid, phthalic esters; or mixtures thereof.

66. The building structure according to claim 59, wherein said binding agent further comprises 0% by weight to 70% by weight, with respect to the total weight of the binding agent, of at least one bitumen.

67. The building structure according to claim 59, wherein said binding agent further comprises from 0% by weight to 30% by weight, with respect to the total weight of the binding agent, of at least one polymeric material; styrene block copolymers or terpolymers, styrene-butadiene-styrene, styrene-isoprene-styrene and styrene-ethylene/butene-styrene triblock polymers; styrene-ethylene/propylene and styrene-ethylene/butene diblock polymers; styrene-butadiene or styrene-isoprene branched polymers, or mixtures thereof.

68. The building structure according to claim 59, wherein said binding agent further comprises 0% by weight to 30% by weight with respect to the total weight of the binding agent, of at least one inert inorganic filler; sand, silica, calcium carbonate, calcium silicates, barium sulfates, talc, mica, carbon black, or mixtures thereof.

* * * * *

UNITED STATES PATENT AND TRADEMARK OFFICE
CERTIFICATE OF CORRECTION

| | | |
|---|---|---|
| PATENT NO. | : 7,861,484 B2 | Page 1 of 1 |
| APPLICATION NO. | : 11/885396 | |
| DATED | : January 4, 2011 | |
| INVENTOR(S) | : Pavan et al. | |

It is certified that error appears in the above-identified patent and that said Letters Patent is hereby corrected as shown below:

Claim 10, column 16, line 52, "sound-insulting" should read --sound-insulating--.

Claim 60, column 22, line 3, "power" should read --powder--.

Signed and Sealed this
Fourteenth Day of June, 2011

David J. Kappos
*Director of the United States Patent and Trademark Office*